United States Patent Office 3,613,412
Patented Oct. 19, 1971

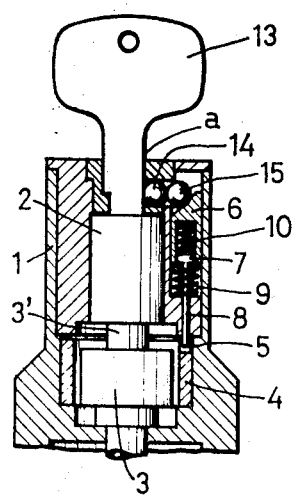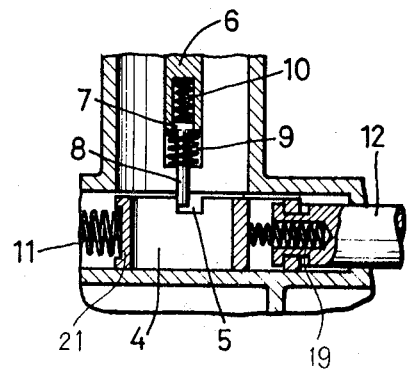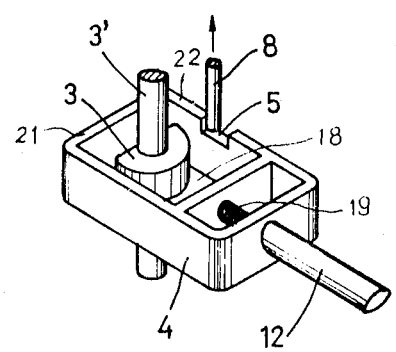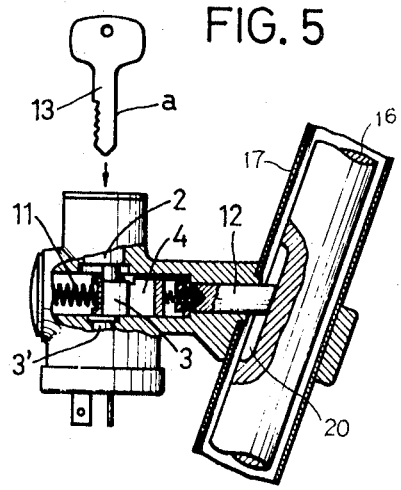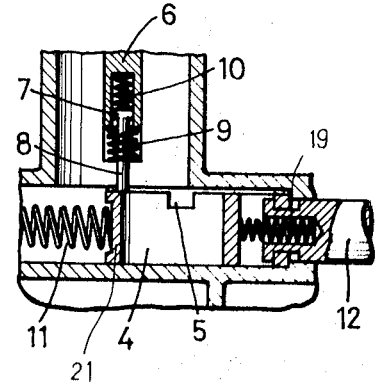

3,613,412
STEERING COLUMN LOCK
Kenichi Yamaguchi, Chigasaki, Japan, assignor to
Nagatoshi Suzuki, Tokyo, Japan
Filed Aug. 17, 1970, Ser. No. 64,327
Int. Cl. B60r 25/02; E05b 63/18
U.S. Cl. 70—252                                             1 Claim

ABSTRACT OF THE DISCLOSURE

The invention relates to a steering column lock having a lock cylinder and provided with a safeguard against accidental locking of the steering through retaining the bolt in releasing position until the key is completely withdrawn from the lock. Said safeguard comprises a key controlled retaining pin and the corresponding catch slot formed in one side of a bolt portion.

The invention relates to a steering column lock for vehicles and the like which has a lock cylinder, with a safeguard against accidental locking of the steering.

It is known for a key-operated retaining member to be engageable in a spring-loaded lock bolt engaging in the steering column, in order that the lock bolt may be retained in its inoperative position so that the vehicle can continue to be steered as long as the key stays in the locking position. The object of this invention is to enable the vehicle to be steered despite the ignition being off, since steering column locks are usually combined with an ignition switch. The retaining member is usually either the tip of the key or a pin controlled by such tip. A disadvantage in this connection is that the key has only to be moved slightly lengthwise to release the retaining member, with a consequent risk of accidents.

It is an object of this invention to provide a steering column lock such that the key must be completely withdrawn from the cylinder of a lock before the lock bolt can move into the steering locking position.

According to this invention, the steering column lock is so designed that the retaining member engages a slot in the lock bolt in releasing position until the key is completely withdrawn from the key hole.

An example of the invention is shown in the accompanying drawings, wherein:

FIG. 1 is a partial sectional view of the steering column lock according to this invention;

FIG. 2 shows a part of the lock wherein the lock bolt is retained in the releasing position;

FIG. 3 shows the lock bolt being released;

FIG. 4 shows a portion of the lock bolt, cam and retaining pin;

FIG. 5 is a side view with partial section of the steering column lock secured to a steering column.

In the example illustrated, the steering column lock according to this invention comprises a body 1 secured to a steering column 17 in which a steering shaft 16 extends.

The body 1 comprises on the one hand a horizontal cavity in which a bolt having portions 4 and 12 is slidably mounted, and on the other hand a recess extending at right angles to said cavity and containing a lock cylinder 2 and bolt driving members. Said lock cylinder is provided with a shaft 3' extending through a cavity 18 formed in the bolt portion 4. The shaft 3' actuates a switch drum, details of which are not shown, and is rotated in accordance with the positions of the cylinder 2. The shaft 3' is provided with a semi-cylindrical cam 3 located in the cavity 18. Immediately behind a faceplate of the lock, a horizontal groove is formed in which steel balls 14 and 15 are placed. Said groove communicates with a vertical groove in which a sliding member 6 having a tapered head is slidably inserted. The sliding member as well as a retaining pin 8, the head of which is placed in the cavity provided in said sliding member, are urged by spring 9 and 10 respectively. The ball 14 protrudes partially into a keyhole of the lock while the other ball 15 bears on the tapered head of the sliding member 6.

The bolt is made of two portions 4 and 12 in relative sliding engagement with resilient means, for example a spring 19, interposed between these portions. The cavity 18 of the bolt portion 4 is of rectangular configuration and the semicylindrical face of the cam 3 acts upon a side 21 so as to cause retreating movement of the bolt while the flat face of said cam limits the forward locking movement of the bolt.

The upper edge of the side 22 of the bolt portion 4 is provided with a catch slot 5 for receiving the end of the retaining pin 8 so as to retain the bolt in the releasing position.

The steering column lock described hereinabove operates as follows:

In FIGS. 3 and 5, the device is shown in its closed or locking position. In this position the springs 11 and 19 are expanded and the bolt end engages the slot 20 formed in the steering shaft 16 to prevent the rotation of said shaft. Further in this position the lower end of the retaining pin 8 only slightly touches the upper edge of the side 22 of the bolt portion 4.

When the key 13 is introduced into the lock, the back $a$ of said key pushes the balls 14 and 15 away from the cylinder 2 whereby the ball 15 cooperating with the tapered head of the sliding member 6 pushes said sliding member down to compress the springs 9 and 10 whereby the retaining pin 8 will press against the upper edge of the side 22.

When the key is rotated, the cam 3 is rotated similarly. The semi-cylindrical face of said cam begins to engage with the side 21 and withdraws the bolt end from the slot 20. There is also provided a spring 11 for constantly urging the bolt portions 4 and 12.

At the final releasing position, the retaining pin 8 snaps into the catch slot 5 so as to prevent movement of the bolt portions and retain the same in releasing position until the key 13 is completely withdrawn from the lock cylinder whereby accidental locking of steering can be avoided.

When the key is withdrawn from engagement by ball 14, the sliding member 6 together with the retaining pin 8 moves upward from the catch slot 5 and releases the bolt member, the latter snapping forward to lock the steering saft. The movement of said bolt member is restricted by the flat face of the cam 3.

Of course, during the rotation of the key 13, the switch is also actuated and operates according to the sequence usually contemplated in devices of this character.

It is understood, the cam 3 is not shown in FIGS. 2 and 3 to avoid confusion.

What I claim is:

1. A steering column lock for vehicles and the like, comprising a body adapted to be secured to a steering column, a lock cylinder in said body, a spring-loaded bolt member including a first portion engageable with a slot formed in the steering shaft and a second aligned portion provided with a rectangular cavity, a semi-cylindrical cam operably connected with the lock cylinder and rotatable within said cavity, upon rotation of said cam the semi-cylindrical face of said cam bringing the bolt to receding position through engaging with one side of the cavity while the flat face of said cam limiting the forward movement of the bolt, a radial groove provided immediately behind a face-plate of the lock and communicating with a vertical groove, two steel balls inserted in said radial groove and adapted to be pushed away from the lock cylinder by means of a back of the key, one of said balls protruding into a keyhole, a sliding member having a tapered head is slidably mounted in said vertical groove and urged by a spring, the tapered had thereof being contact with the other ball, a retaining pin arranged within said sliding member and urged by a spring, the lower end of the retaining pin being in contact with the upper edge of another side of the cavity provided in the second portion of the bolt member, a catch slot formed in said upper edge for receiving the end of the retaining pin at the releasing position of the bolt and a switch drum operably conncted with the lock cylinder.

References Cited

UNITED STATES PATENTS

| | | | |
|---|---|---|---|
| 1,592,091 | 7/1926 | Fairchild | 70—252 |
| 1,699,973 | 1/1929 | Kenworthy | 70—252 |
| 2,063,088 | 12/1936 | Fitzgerald | 70—252 |
| 3,527,071 | 8/1970 | Warnod | 50—252 |
| 3,566,635 | 3/1971 | Wolter | 70—252 |

FOREIGN PATENTS

| | | | |
|---|---|---|---|
| 1,081,367 | 8/1967 | Great Britain | 70—252 |
| 1,539,404 | 8/1968 | France | 70—252 |

ALBERT G. CRAIG, JR., Primary Examiner

U.S. Cl. X.R.

70—186